und States Patent (12) United States Patent
Griffin (10) Patent No.: US 8,099,126 B2
(45) Date of Patent: Jan. 17, 2012

(54) ACTUATOR NOTIFICATION SYSTEM FOR USE WITH A MOBILE COMMUNICATIONS DEVICE, A METHOD OF AUTOMATICALLY DRIVING AN ACTUATOR ON A MOBILE COMMUNICATIONS DEVICE, AND A MOBILE COMMUNICATIONS DEVICE UTILIZING SAME

(75) Inventor: Jason Griffin, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 386 days.

(21) Appl. No.: 12/394,331

(22) Filed: Feb. 27, 2009

(65) Prior Publication Data

US 2010/0222096 A1  Sep. 2, 2010

(51) Int. Cl.
*H04M 1/00* (2006.01)
*H04B 1/38* (2006.01)

(52) U.S. Cl. ............... 455/550.1; 455/90.3; 455/556.2; 455/575.1

(58) Field of Classification Search .............. 455/90.3, 455/347, 550.1, 556.1, 556.2, 569.1, 575.1
See application file for complete search history.

(56) References Cited

U.S. PATENT DOCUMENTS

| 4,316,067 | A  | * | 2/1982  | Whiteman, Jr. ......... 200/325 |
| 7,170,214 | B2 | * | 1/2007  | Henderson et al. .... 310/323.02 |
| 7,612,765 | B2 | * | 11/2009 | Wernersson .............. 345/168 |
| 7,660,609 | B2 | * | 2/2010  | Karan et al. ............. 455/567 |
| 2005/0130604 | A1 | * | 6/2005  | Chipchase et al. ....... 455/90.3 |
| 2006/0181517 | A1 | * | 8/2006  | Zadesky et al. .......... 345/173 |
| 2010/0035665 | A1 | * | 2/2010  | Munson ................ 455/575.1 |

FOREIGN PATENT DOCUMENTS

| WO | 2008004049 | 1/2008 |
| WO | 2009009327 | 1/2009 |

OTHER PUBLICATIONS

Labrador, Agreda A., Extended European Search Report for EP 09154045.0, Jul. 21, 2009.

* cited by examiner

*Primary Examiner* — Nick Corsaro
*Assistant Examiner* — Michael S Bush
(74) *Attorney, Agent, or Firm* — Integral Intellectual Property Inc.; Miriam Paton (57) ABSTRACT

An actuator notification system is for use with a mobile communications device. A device actuator is selectively movable, by hand, between first and second positions. An electric drive motor operatively engages the actuator. A control processor on-board the device is operatively encoded to start the motor, so as to drive the actuator between the first and second positions. A related method of automatically driving an actuator on a mobile communications device uses a control processor on-board the device which is encoded to start a motor and drive an actuator between first position and second positions. A related mobile communications device is also disclosed.

20 Claims, 11 Drawing Sheets

ACTUATOR NOTIFICATION SYSTEM FOR USE WITH A MOBILE COMMUNICATIONS DEVICE, A METHOD OF AUTOMATICALLY DRIVING AN ACTUATOR ON A MOBILE COMMUNICATIONS DEVICE, AND A MOBILE COMMUNICATIONS DEVICE UTILIZING SAME

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

FIELD OF THE INVENTION

The present invention relates generally to an actuator notification system for use with a mobile communications device, a method of automatically driving an actuator on a mobile communications device, and a mobile communications device utilizing same.

BACKGROUND

Handheld wireless communication devices may have previously provided with one or more actuators mounted on the housing. Each actuator is selectively movable, by hand, between first and second positions. The actuators may be used for a variety of functions. For example, actuators may be used to switch between alert profiles, such as, normal and silent. Other actuators may have been used to switch between wireless on and off modes. Still other actuators may have been used to control software application settings. Of course, hand-movable actuators have also been put to other uses. Such actuators are very easy for a user to understand and can be readily checked for status or position by looking at, or feeling, the switch—i.e., instead of requiring the user to perform a detailed examination of the User Interface (UI) on the device. Users can also manually adjust such actuators without even looking at the mobile communications device.

Prior art mobile communications device actuators, however, have required manual operation by hand, without allowing for operation by software or, for that matter, by the user's operation of the UI. Such limitations may have prevented the implementation of more elegant functionality and synergies with, for example, time-outs for automatic keylock/password lock, complex profile settings, or software applications which might otherwise be designed to "decide" whether to turn on wireless functionality when accessed.

What is needed is a mobile communications device actuator enabling operation, by hand, of mobile device features (e.g., power, keylock/password lock, profile settings, wireless on and off, short-range communications on and off) which electrically knows it position, and which also may be automatically moved from one position to another by the device. What may be needed is an actuator having a best-of-both-worlds functionality, which neither a hardware solution nor a UI software solution may have been previously able to provide.

DETAILED DESCRIPTION

As noted above, the present invention relates to an actuator notification system 200 for use with a mobile device 100, and a method 300 of automatically driving an actuator 210 on a mobile device 100.

Figure 1:
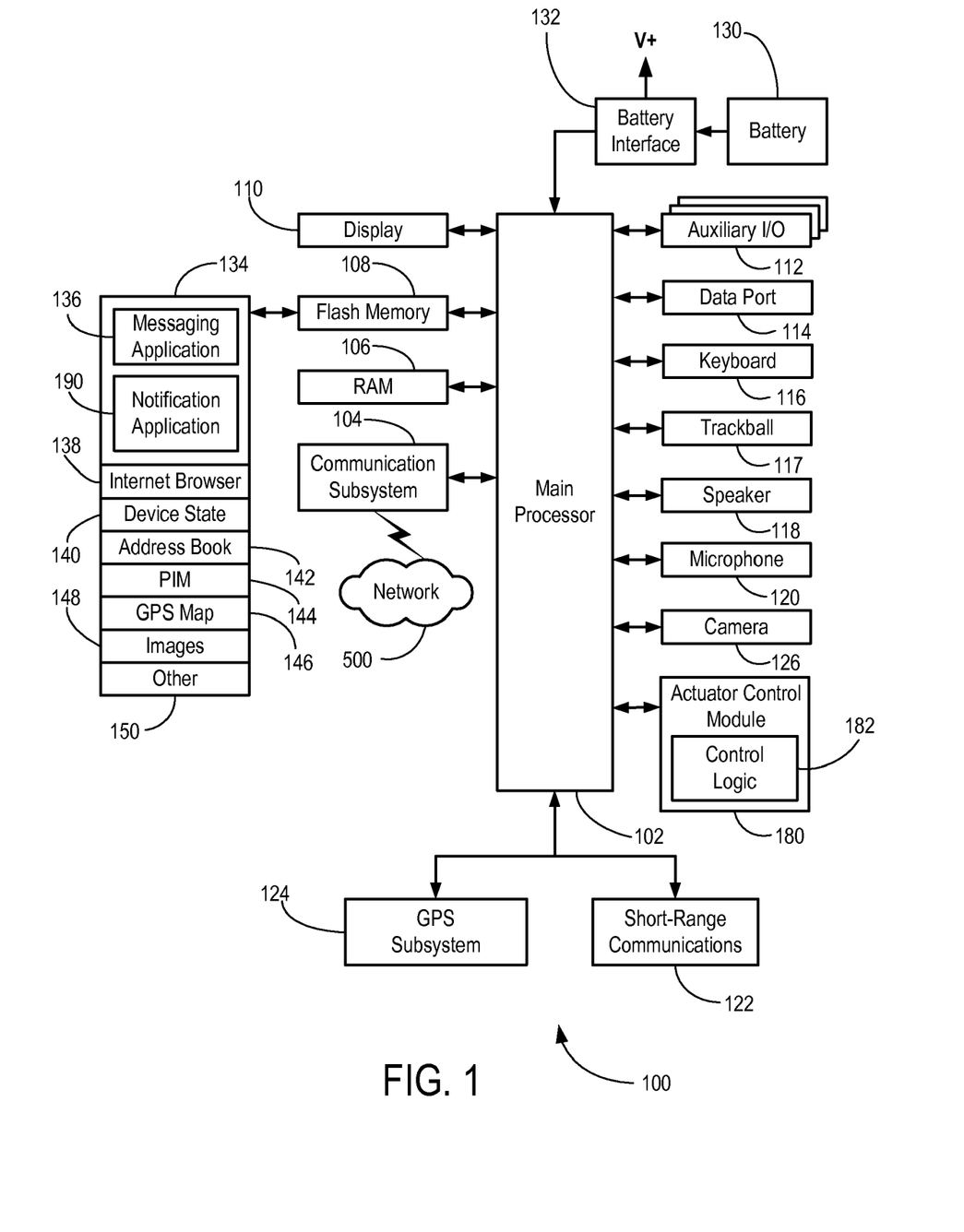
FIG. 1 is a schematic block diagram of various components that may be found in a handheld mobile communication device.
Figure 2:
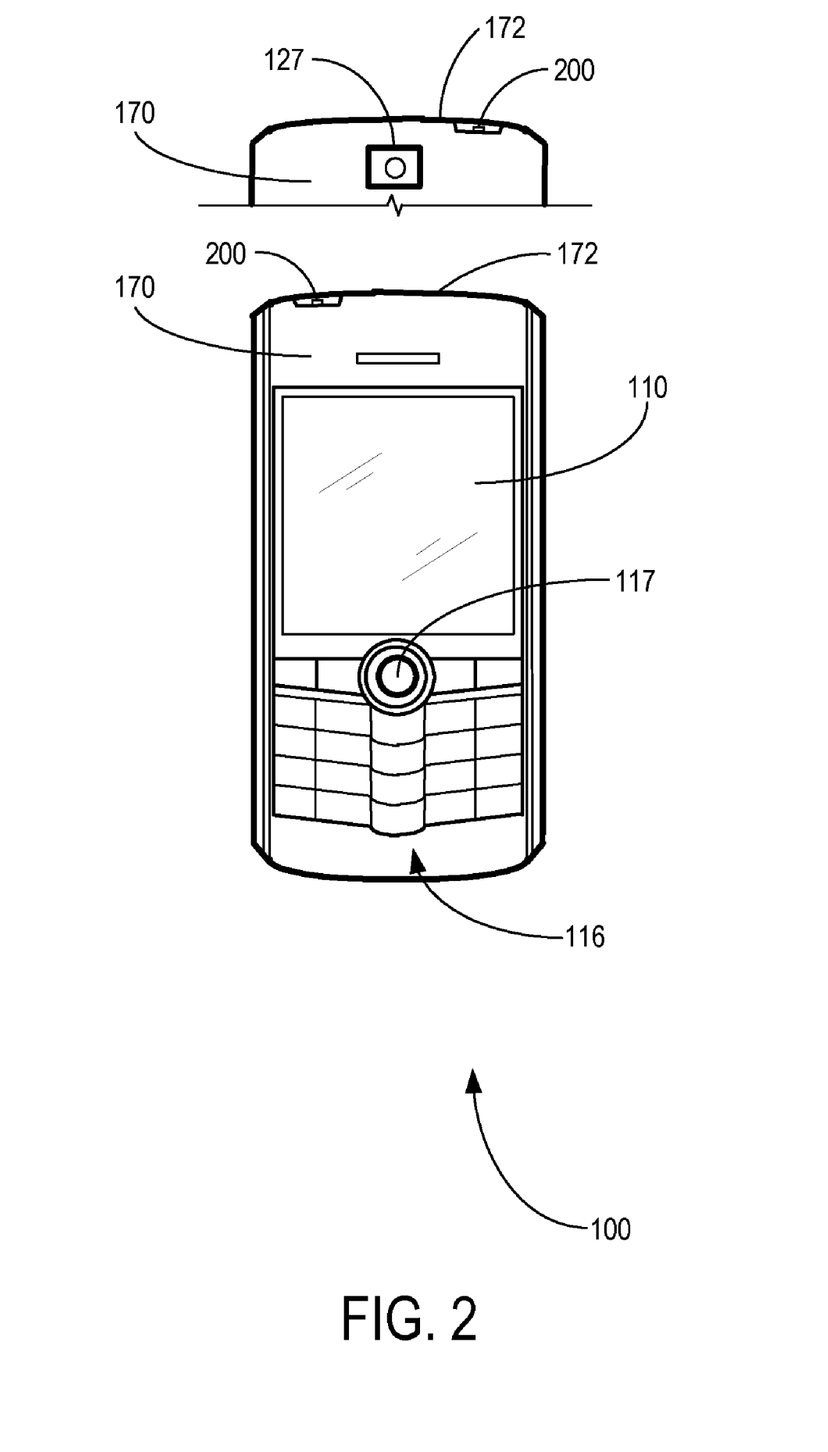
FIG. 2 is an illustrative example of a handheld mobile communication device that provides an operating environment for an actuator notification system, according to the present invention.

As shown in FIG. 2, there is shown a mobile device 100 including a housing 170 and an actuator notification system 200 according to the present invention. As shown in FIGS. 3-10, the actuator notification system 200 includes at least one actuator 210 (e.g., a sliding switch), and an electric drive motor 240. The motor 240 is, preferably, a bi-stable piezo-electric linear motor. The actuator notification system 200 also includes an actuator control module 180, which works in conjunction with the main processor 102 (as shown in FIG. 1).

In an illustrative embodiment, the invention may be practiced with a handheld mobile communication device in a wireless operating environment. Shown in FIG. 1 is a schematic block diagram of an illustrative handheld mobile communication device 100. The communication device 100 may comprise a number of components, including a main processor 102 which controls the overall operation of communication device 100. Communication functions, including data and voice communications, may be performed through a communication subsystem 104. The communication subsystem 104 may receive messages from and send messages to a wireless network 500.

The main processor 102 may also interact with additional subsystems such as a random access memory (RAM) 106, a flash memory 108, a display 110, an auxiliary input/output (I/O) subsystem 112, a data port 114, a keyboard 116, a trackball 117, a speaker 118, a microphone 120, short-range communications 122, a GPS subsystem 124, a camera module 126, and an actuator control module 180.

Some of the subsystems of the communication device 100 may perform communication-related functions, and some may provide "resident" or on-device functions. By way of example, the display 110 and the keyboard 116 may be used for both communication-related functions, such as entering a text message for transmission over the network 500, and device-resident functions such as a calculator or task list. The trackball 117 may be used for various navigation functions, such as navigating through a graphical user interface (GUI) menu displayed on display 110. The trackball 117 may also be configured with a secondary actuation feature, such as allowing a user to depress the trackball, to allow selection of a highlighted item.

The GPS subsystem 124 may be operatively connected to the main processor 102 to pass acquired latitude and longitude coordinates to one or more software applications 134, and to store the latitude and longitude coordinates as may be required into flash memory 108 or RAM 106.

Image capture using camera module 126 may be initiated by a user controlling a dedicated camera shutter, or a context dependent programmable button or key (on keyboard 116, for example) that may act as a camera shutter button.

As will be described in detail further below, in order to use an automatic drive control system 200 to automatically drive an actuator 210 on the communications device 100, the actuator control module 180 may be provided with control logic 182.

Still referring to FIG. 1, operating system software used by the main processor 102 is typically stored in a persistent store such as flash memory 108. Those skilled in the art will appreciate that the operating system, specific device applications, or parts thereof, may be temporarily loaded into a volatile store, such as the RAM 106, for processing by main processor 102.

The communication device 100 may send and receive communication signals over the wireless network 500 after required network registration or activation procedures have been completed. Network access may be associated with a subscriber or user of the communication device 100.

The communication device 100 may be a battery-powered device and may include a battery interface 132 for receiving one or more rechargeable batteries 130. In some embodiments, the battery 130 may be a smart battery with an embedded microprocessor. The battery interface 132 is coupled to a regulator (not shown), which assists the battery 130 in providing power V+ to the communication device 100. The battery 130 may be used to power all components and modules in the communication device 100, including the automatic drive control system 200.

The main processor 102, in addition to its operating system functions, enables execution of various software applications 134 on the communication device 100. A subset of software applications 134 that control basic device operations, including data and voice communication applications, will normally be installed on the communication device 100 during its manufacture.

The software applications 134 may include a messaging application 136. The messaging application 136 can be any suitable software program that allows a subscriber or user of the communication device 100 to send and receive wireless text communications. Various alternatives exist for the messaging application 136 as is well known to those skilled in the art. Messages that have been sent or received by the user are typically stored in local storage such as flash memory 108 of the communication device 100, or in some other suitable storage element in the communication device 100. In an alternative embodiment, some of the sent and received messages may be stored remotely from the communication device 100 such as in a data store of an associated host system that the communication device 100 communicates with. In an embodiment, the messaging application 136 may include a Message List user interface that is configured to allow a user to see a list of message objects (i.e. email messages) in a convenient list form.

The software applications 134 may also include a GPS map application 146 for providing geographic navigation, and location coordinates for geotagging objects. GPS map application 146 may be configured to operatively connect to GPS subsystem 124 to receive GPS latitude and longitude coordinates for a current position of the communication device 100. GPS map application 146 may also store scalable maps of various geographic regions in order to show the current position of communication device 100 on the map. As well, the GPS map application 146 may be configured to obtain latitude and longitude location coordinates by allowing a user to select a position on the GPS map.

Still referring to FIG. 1, communication device 100 may execute an Image Applications Module 148 that may be operatively integrated with camera module 126, main processor 102, RAM 106, display 110 and various other modules and components to provide various image application functions for the images captured by the camera module 126.

The communication device 100 may further include a device state module 140, an address book 142, a Personal Information Manager (PIM) 144, and various other modules 150. Additional software applications may also be loaded onto the communication device 100 through at least one of the wireless network 500, the auxiliary I/O subsystem 112, the data port 114, the short-range communications subsystem 122, or another device subsystem.

Now referring to FIG. 2, shown is an illustrative front view of a handheld mobile communication device 100 that may provide a suitable operating environment. As shown, the communication device 100 may include a display 110, a keyboard 116, and other input or navigation means such as a trackball 117. The display 110 may be configured to display various screens allowing the user of device 100 to view screen outputs from the various software applications 134, including a notification application 190. Display 110 may also be configured to provide a touch-sensitive screen input in response to a prompt or query displayed on display 110. In an embodiment, the integrated camera 126 may provide a camera lens 127 on the back of the communication device 100, such that a user may use the display 110 as a camera viewfinder for framing an image.

Now, with reference to FIGS. 3-10, it will be appreciated that first and second stop members 230, 232 securely engage a wall 172 inside the housing 170.

The actuator 210 is mounted on the housing 170. It has a manipulable portion 212 and a housing engaging portion 214. As shown in FIGS. 3-10, an underside of the manipulable portion 212 may be shaped to define a recessed motor link portion 216. Preferably, the motor link portion 216 of the actuator 210 securely engages an actuator link portion 260 of the motor 240. The actuator 210 is preferably also provided with electrical contacts 220,220 which communicate a present position of the actuator 210 to the actuator control module 180. Other electrical contacts may be used according to the present invention (e.g., a varistor).

Figure 5:
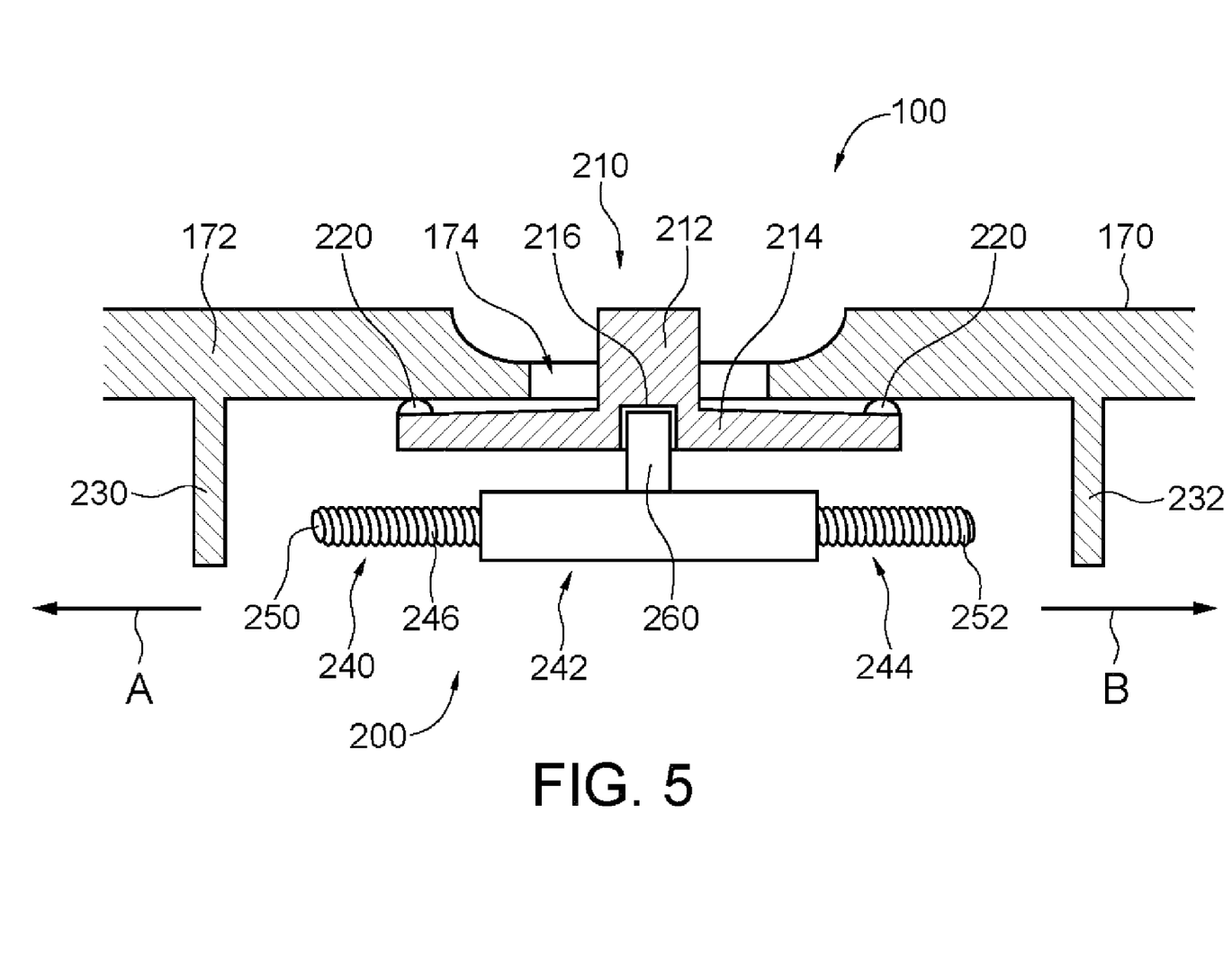
FIG. 5 is a view similar to FIG. 3, showing the system in an intermediate clear configuration.
Figure 6:
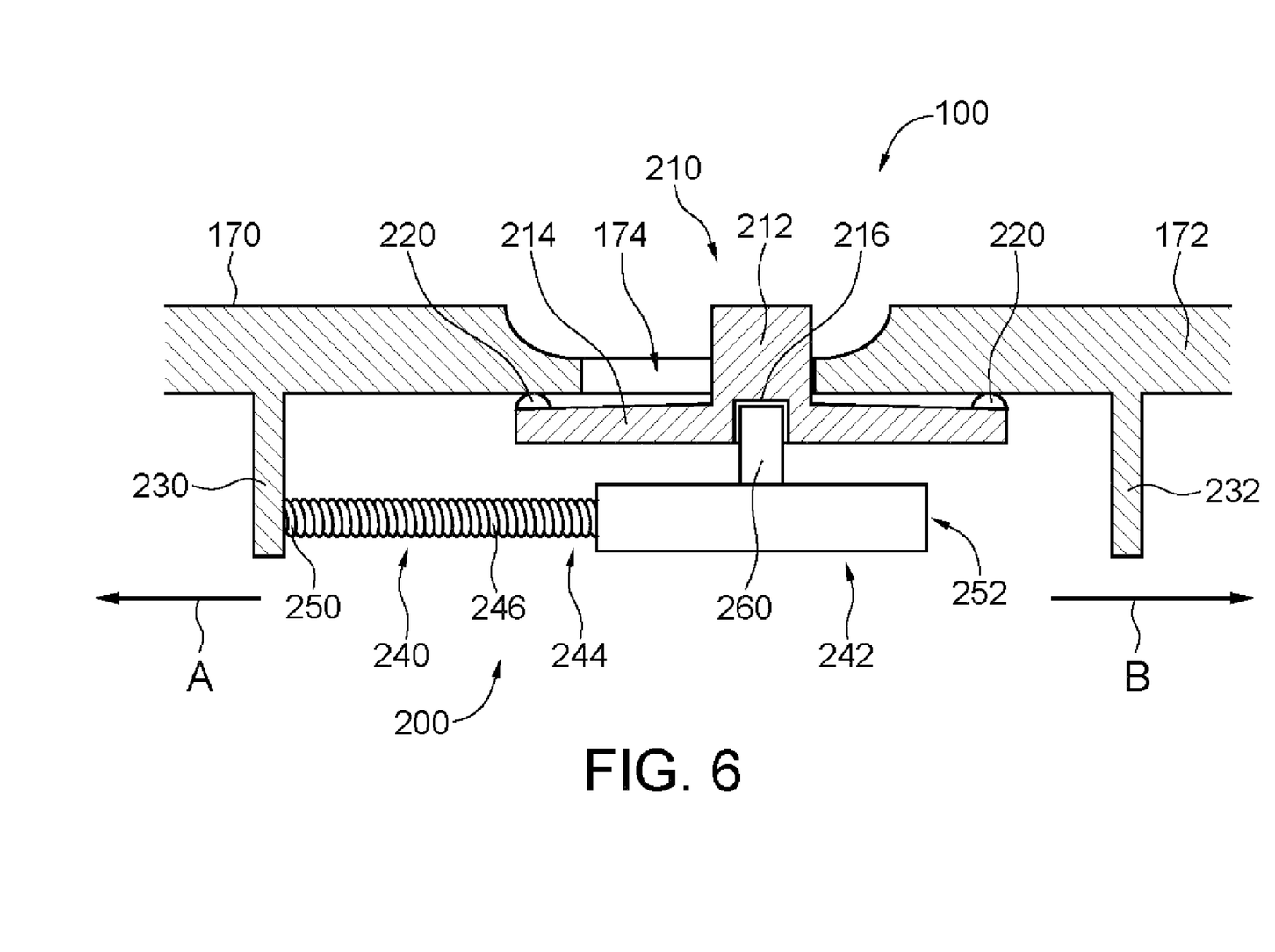
FIG. 6 is a view similar to FIG. 3, showing the system in a first end configuration.
Figure 7:
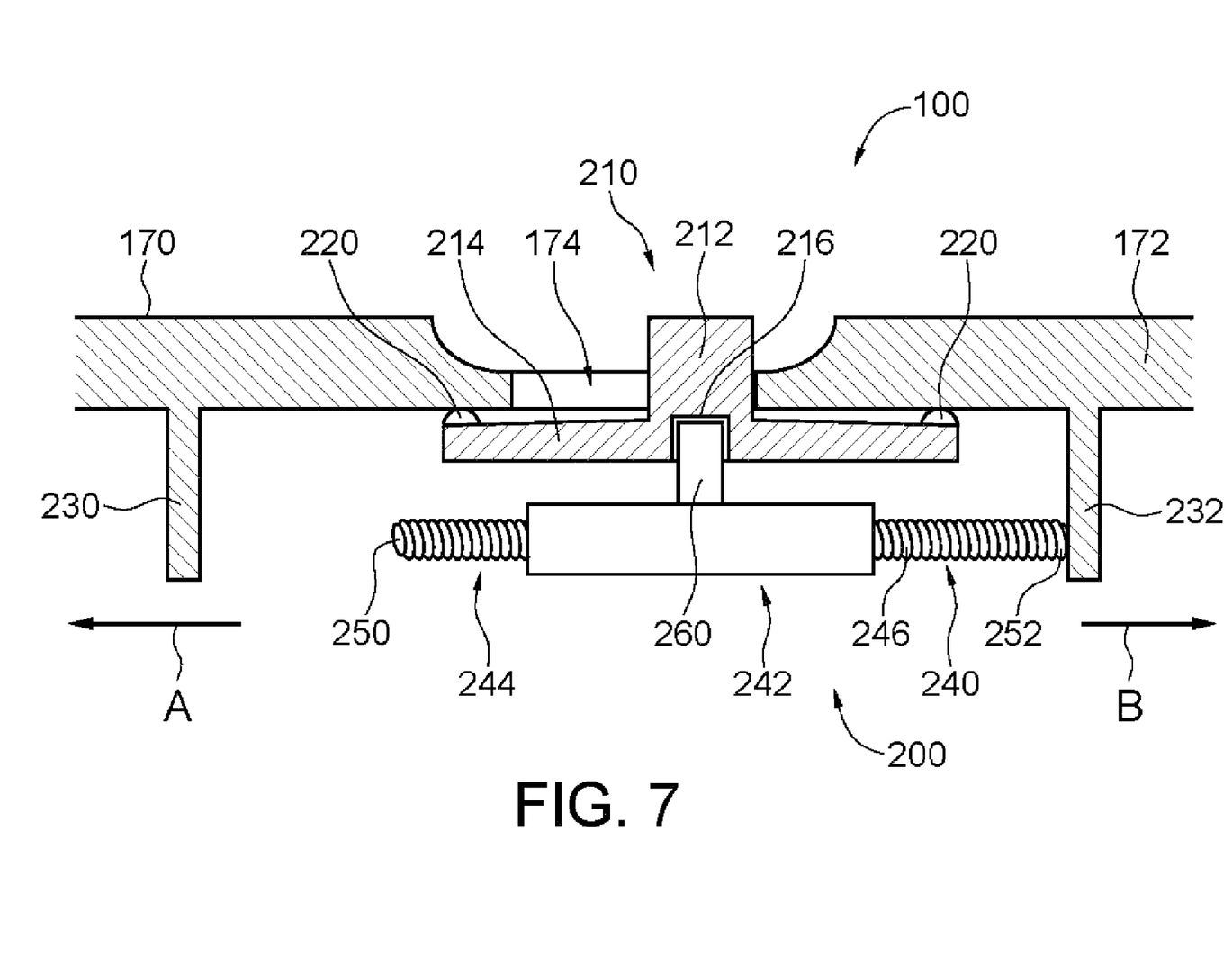
FIG. 7 is a view similar to FIG. 3, showing the system in a second clear drive configuration.
Figure 9:
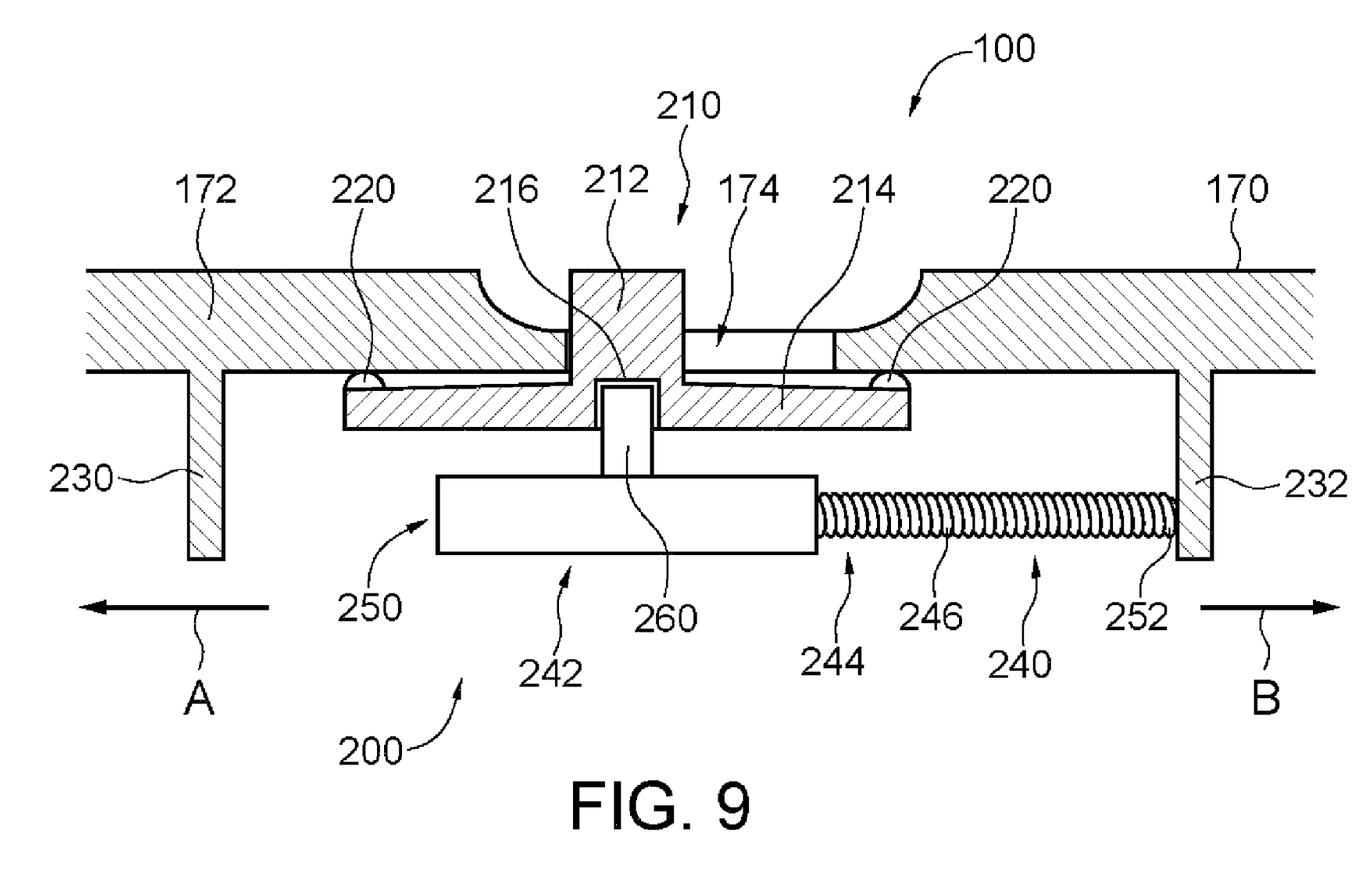
FIG. 9 is a view similar to FIG. 3, showing the system in a second end configuration.
Figure 10:
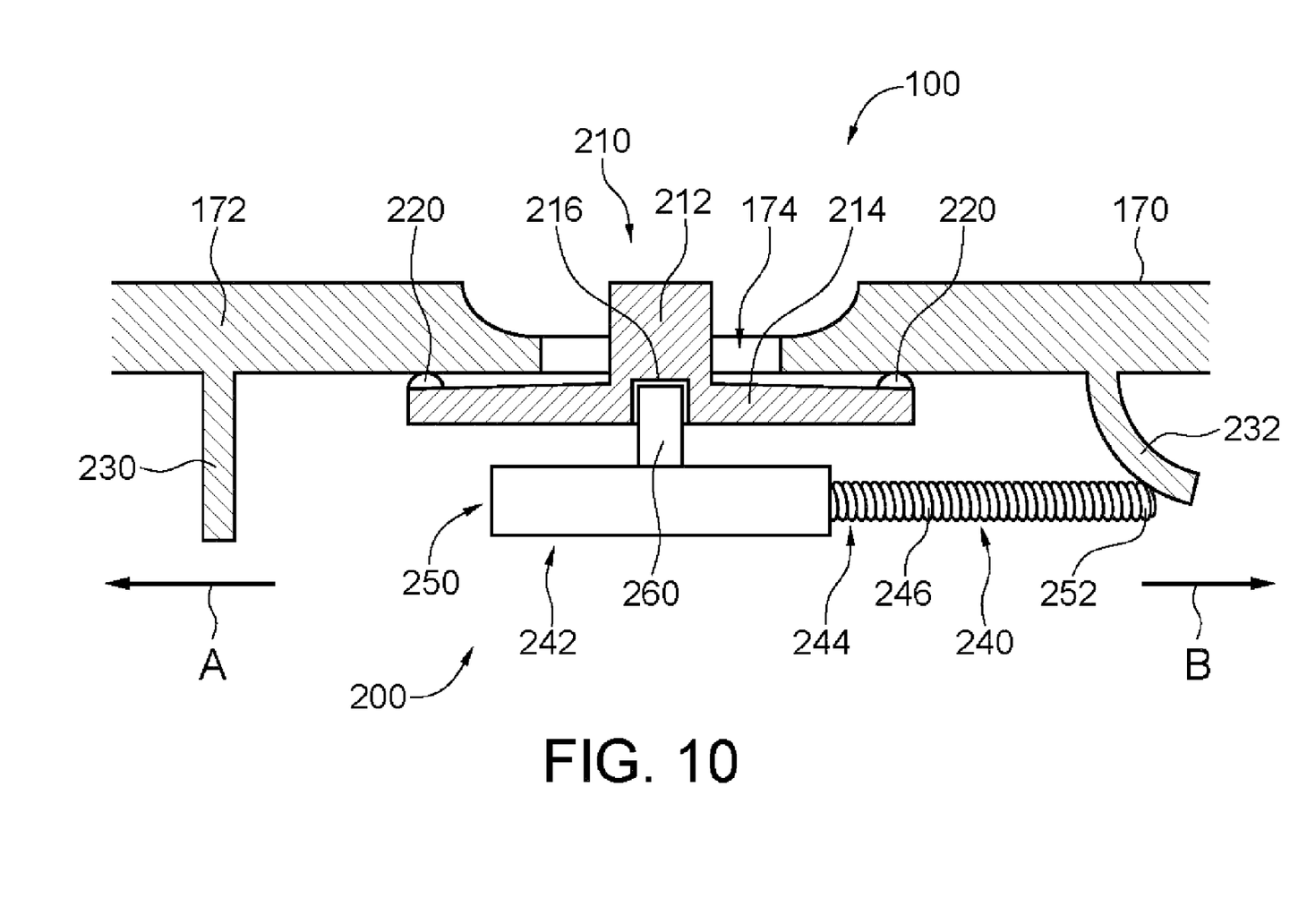
FIG. 10 is a view similar to FIG. 3, showing the system in an intermediate deflected configuration.

The actuator 210 is selectively movable, by hand and by the motor 240, between a first position (shown in FIGS. 3 and 9) and a second position (shown in FIGS. 6-7 and 10). In some embodiments of the present invention, the actuator 210 may also be selectively movable, by hand and by the motor 240, into an intermediate position (shown in FIGS. 4-5 and 8) which lies between the first and second positions. The actuator 210 may be a sliding switch having a plurality of discrete positions, or it may be a continuously variable switch (e.g., a slider). Other actuators 210 may also be used in accordance with the present invention, including buttons (e.g., positioned buttons), lever switches, and knobs.

The piezo-electric linear motor 240 includes a threaded nut 242 and a mating elongate threaded screw 244. Preferably, the threaded nut 242 is a piezo-electric ceramic element, on which is mounted the actuator link portion 260 that securely engages the motor link portion 216 of the actuator 210. The threaded screw 244 has longitudinally opposed first and second end portions 250, 252, and a threaded portion 246 which threadingly engages the nut 242. Other bi-stable motors capable of use in association with the present invention may include other piezo-electric and/or solenoid components, as well as Micro-Electro-Mechanical motors (MEMs).

The actuator control module 180 is provided with control logic 182. The control logic 182 and the notification application 190 may together encode the main processor 102 to start the motor 240, so as to drive the actuator 210 between the first position (shown in FIGS. 3 and 9) and the second position (shown in FIGS. 6-7 and 10). The main processor 102, in starting the motor 240, longitudinally translates the threaded nut 242 and the mating threaded screw 244 relative to one another.

Electrical connectors such as lead wires (not shown) facilitating electrical communication between the actuator control module 180 and the threaded nut 242 of the actuator notification system 200 may be used, by the main processor 102, to start the motor 240. Additional wires (not shown) from the electrical contacts 220, 220 may be used to communicate the present position of the actuator 210 to the actuator control module 180.

Preferably, the main processor 102 may be operatively encoded to start the motor 240 in dependence upon one of the software applications 134 (e.g., the notification application 190) operatively loaded onto the device 100. That is, the main processor 102 may be encoded to start the motor 240 only when, during operation, it is necessary to move the actuator 210. In at least this sense, persons having ordinary skill in the art may properly characterize the main processor 102 as being "operatively" encoded to start the motor 240. The notification application 190 may be a software application, operatively loaded onto the device, that interfaces with other software applications 134 to automatically drive the actuator 210 in response thereto. For example, the notification application 190 may interface with software applications 134 that control basic device operations or with the messaging application 136, the GPS map application 146, the Image Applications Module 148, the device state module 140, the address book 142, the Personal Information Manager (PIM) 144, or one of the various other modules 150. Alternately, any of these software applications 134 may be adapted to directly automatically drive the actuator 210, without the notification application 190.

Figure 3:
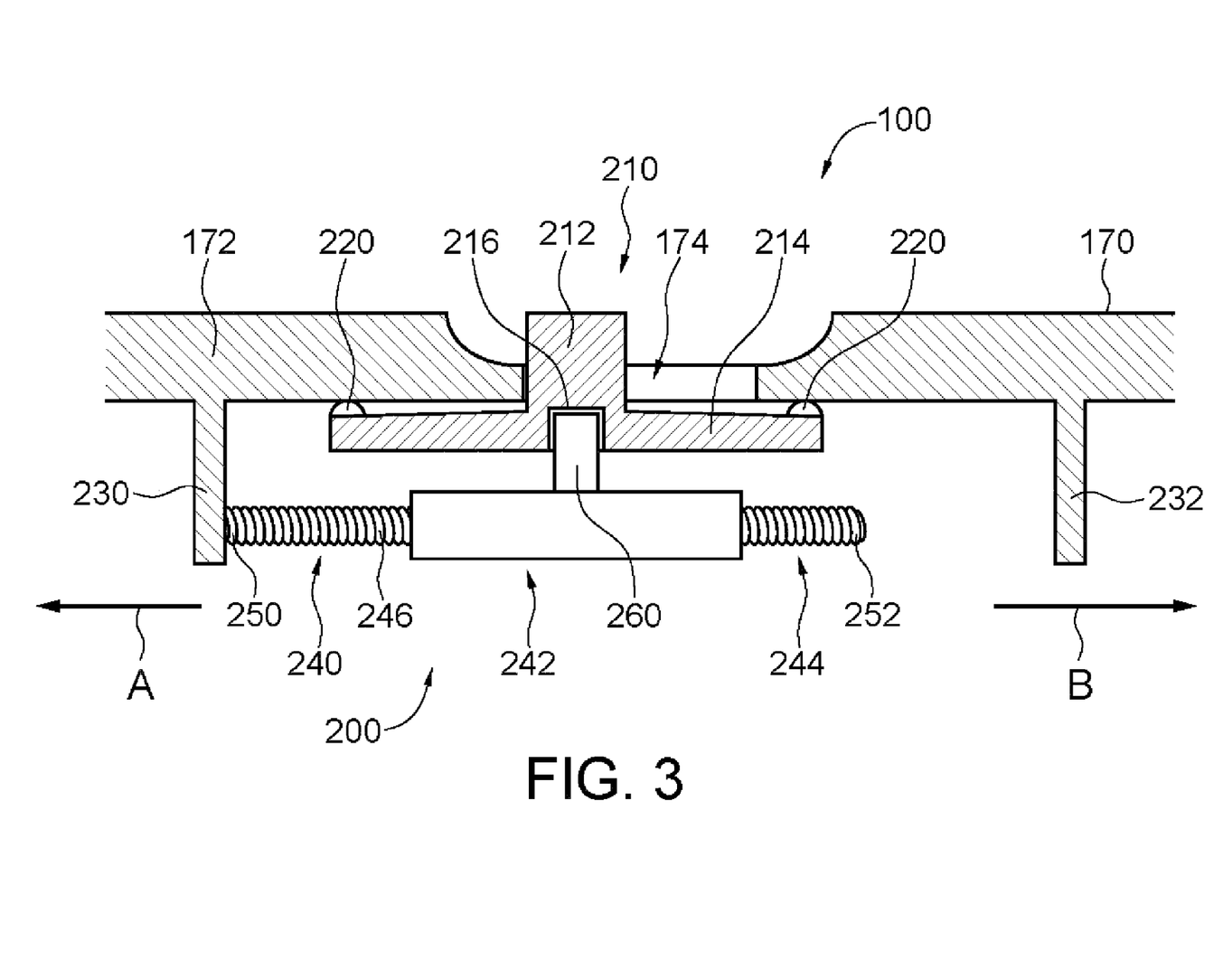
FIG. 3 is a side partially sectional view of the actuator notification system according to the present invention, shown in a first clear drive configuration with a mobile device.
Figure 4:
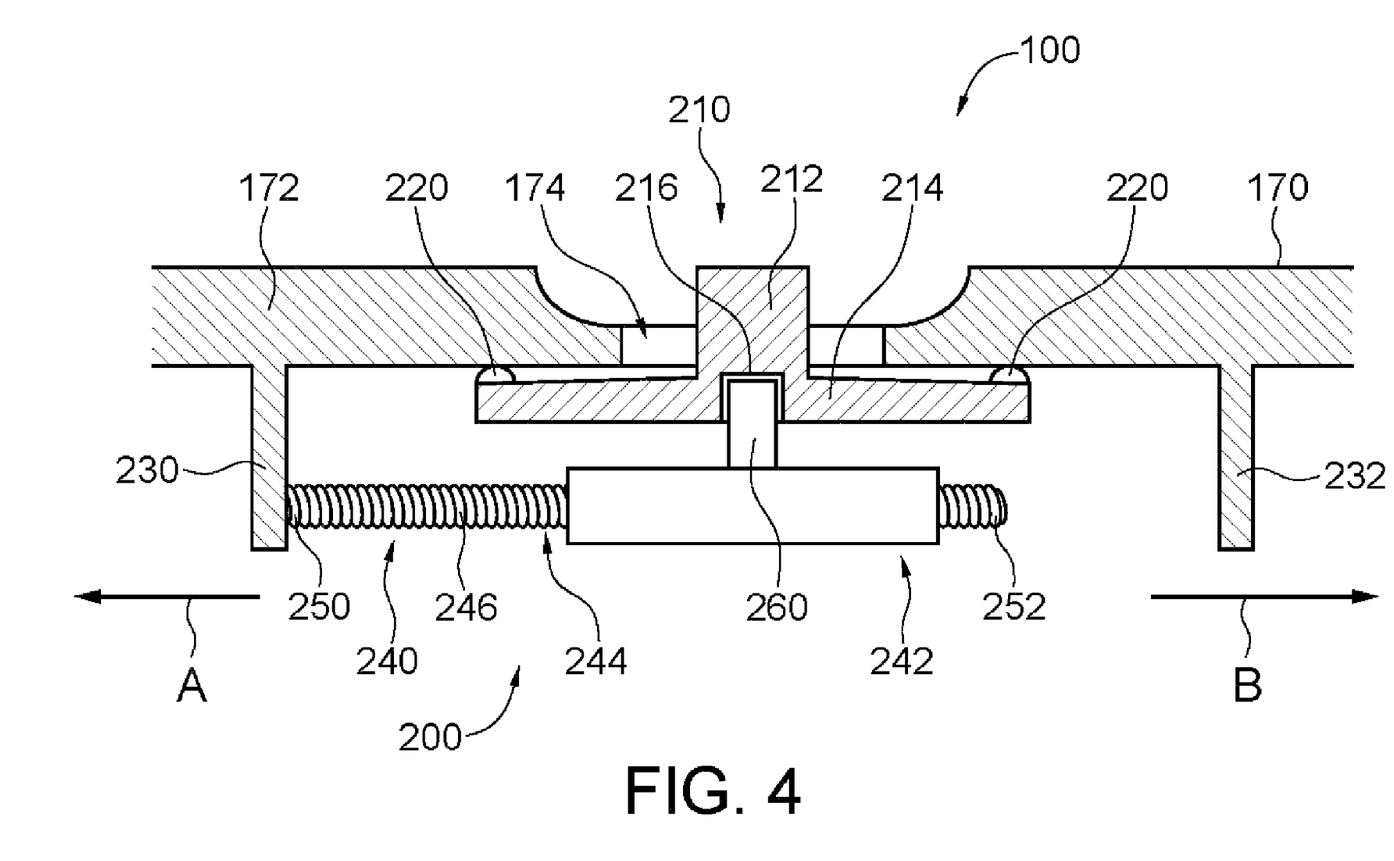
FIG. 4 is a view similar to FIG. 3, showing the system in a first intermediate drive configuration.

In sequence, FIGS. 3, 4 and 6 may be interpreted as showing the actuator 210 being driven by the motor 240 from the first position (shown in FIG. 3), past the intermediate position (shown in FIG. 4), and into the second position (shown in FIG. 6). Now, before the motor 240 drives the actuator 210 towards the second position (as indicated generally by arrow "B" in the FIGS. 3, 4 and 6), the control logic 182 and the notification application 190 may preferably encode the main processor 102 to have the motor 240 longitudinally translate the first end portion 250 of the threaded screw 244 into engagement with the first stop member 230, if it is not there already. Thereafter, the motor 240 may urge the first end portion 250 against the first stop member 230 (in the direction generally indicated by arrow "A" in the FIGS. 3, 4 and 6) to drive the actuator 210 towards the second position.

After the actuator 210 is moved into the second position shown in FIG. 6, the main processor 102 (encoded by the control logic 182 and/or by the notification application 190) preferably directs the motor 240 to longitudinally translate the second end portion 252 of the threaded screw 244 into engagement with the second stop member 232 (shown in FIG. 7).

Figure 8:
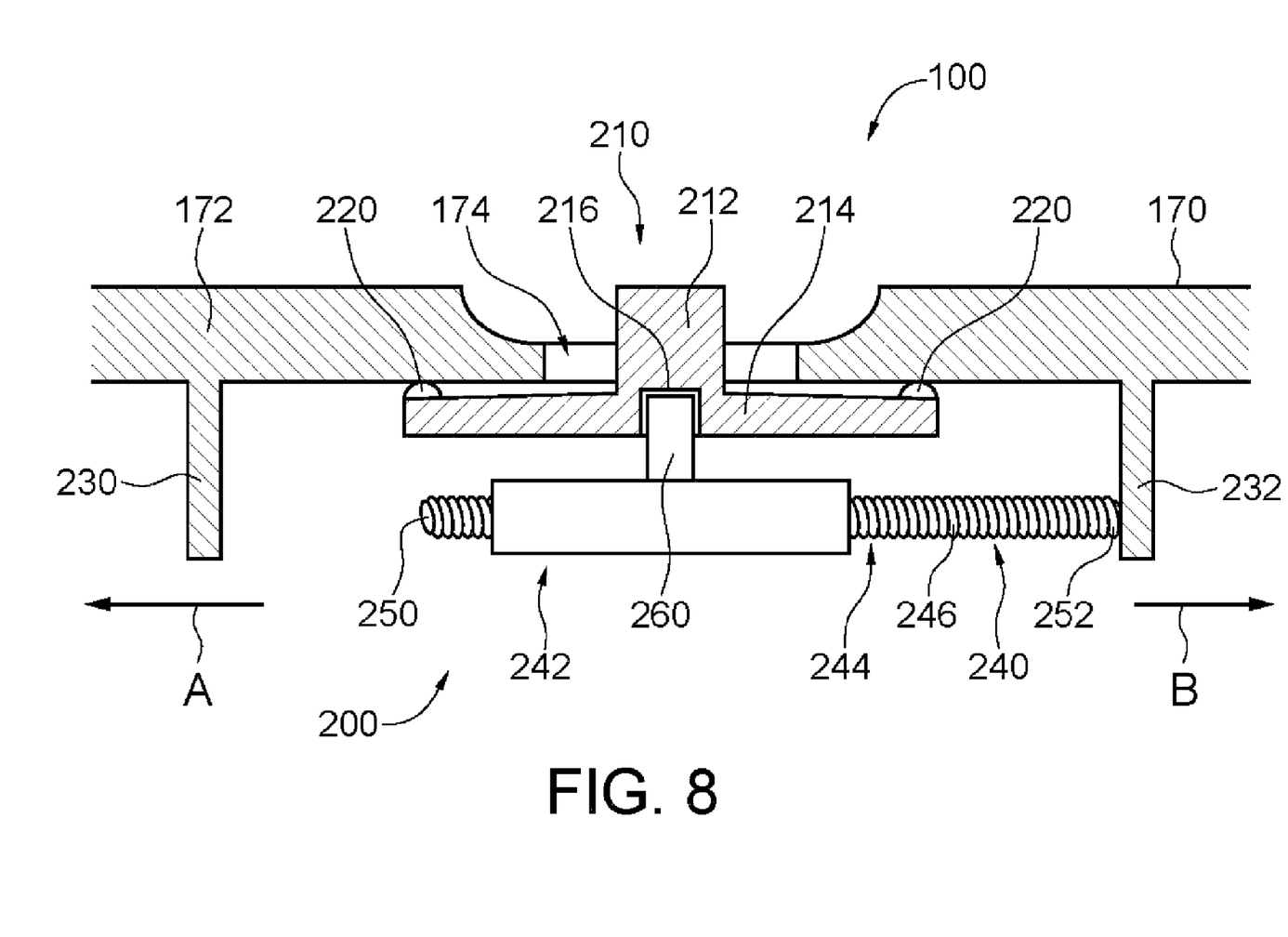
FIG. 8 is a view similar to FIG. 3, showing the system in a second intermediate drive configuration.

In sequence, FIGS. 7, 8 and 9 may be interpreted as showing the actuator 210 being driven by the motor 240 from the second position (shown in FIG. 7), past the intermediate position (shown in FIG. 8), and into the first position (shown in FIG. 9). Now, before the motor 240 drives the actuator 210 towards the first position (in the direction generally indicated by arrow "A" in the FIGS. 7, 8 and 9), the control logic 182 and the notification application 190 may preferably encode the main processor 102 to have the motor 240 longitudinally translate the second end portion 252 of the threaded screw 244 into engagement with the second stop member 232, if it is not there already. Thereafter, the motor 240 may urge the second end portion 252 against the second stop member 232 (in the direction generally indicated by arrow "B" in the FIGS. 7, 8 and 9) to drive the actuator 210 towards the first position.

After the actuator 210 is moved into the first position shown in FIG. 9, the main processor 102 (encoded by the control logic 182 and/or by the notification application 190) preferably directs the motor 240 to longitudinally translate the first end portion 250 of the threaded screw 244 into engagement with the first stop member 230 (as shown in FIG. 1).

Both the set of FIGS. 3 and 4, and the set of FIGS. 7 and 8, may be interpreted as showing the actuator 210 being driven by the motor 240 into the intermediate position (shown in FIGS. 4 and 8).

In sequence, FIGS. 3 and 4 may be interpreted as showing the actuator 210 being driven by the motor 240 from the first position (shown in FIG. 3) and into the intermediate position (shown in FIG. 4). Now, before the motor 240 drives the actuator 210 away from the first position (in the direction generally indicated by arrow "B" in the FIGS. 3 and 4), the control logic 182 and the notification application 190 may preferably encode the main processor 102 to have the motor 240 longitudinally translate the first end portion 250 of the threaded screw 244 into engagement with the first stop member 230, if it is not there already. Thereafter, the motor 240 may urge the first end portion 250 against the first stop member 230 (in the direction generally indicated by arrow "A" in the FIGS. 3 and 4) to drive the actuator 210 towards the intermediate position.

Similarly, in sequence, FIGS. 7 and 8 may be interpreted as showing the actuator 210 being driven by the motor 240 from the second position (shown in FIG. 7) and into the intermediate position (shown in FIG. 8). Now, before the motor 240 drives the actuator 210 away from the second position (in the direction generally indicated by arrow "A" in the FIGS. 7 and 8), the control logic 182 and the notification application 190 may preferably encode the main processor 102 to have the motor 240 longitudinally translate the second end portion 252 of the threaded screw 244 into engagement with the second stop member 232, if it is not there already. Thereafter, the motor 240 may urge the second end portion 252 against the second stop member 232 (in the direction generally indicated by arrow "B" in the FIGS. 7 and 8) to drive the actuator 210 towards the intermediate position.

After the actuator 210 is moved into the intermediate position shown in FIGS. 4 and 8, the main processor 102 (encoded by the control logic 182 and/or by the notification application 190) preferably directs the motor 240 to longitudinally translate the threaded screw 244, out of engagement with both of the stop members 230, 232 (shown in FIG. 5).

It may be appreciated that FIGS. 3, 5 and 7 show the actuator notification system 200 in a first "clear" drive configuration, an intermediate "clear" configuration, and a second "clear" drive configuration, respectively. The configurations (and the positions for the motor 240) shown in FIGS. 3, 5 and 7 may be considered "clear" insofar as the actuator 210 may be freely moved (without impediment), by hand, from any of the shown positions.

Figure 11:
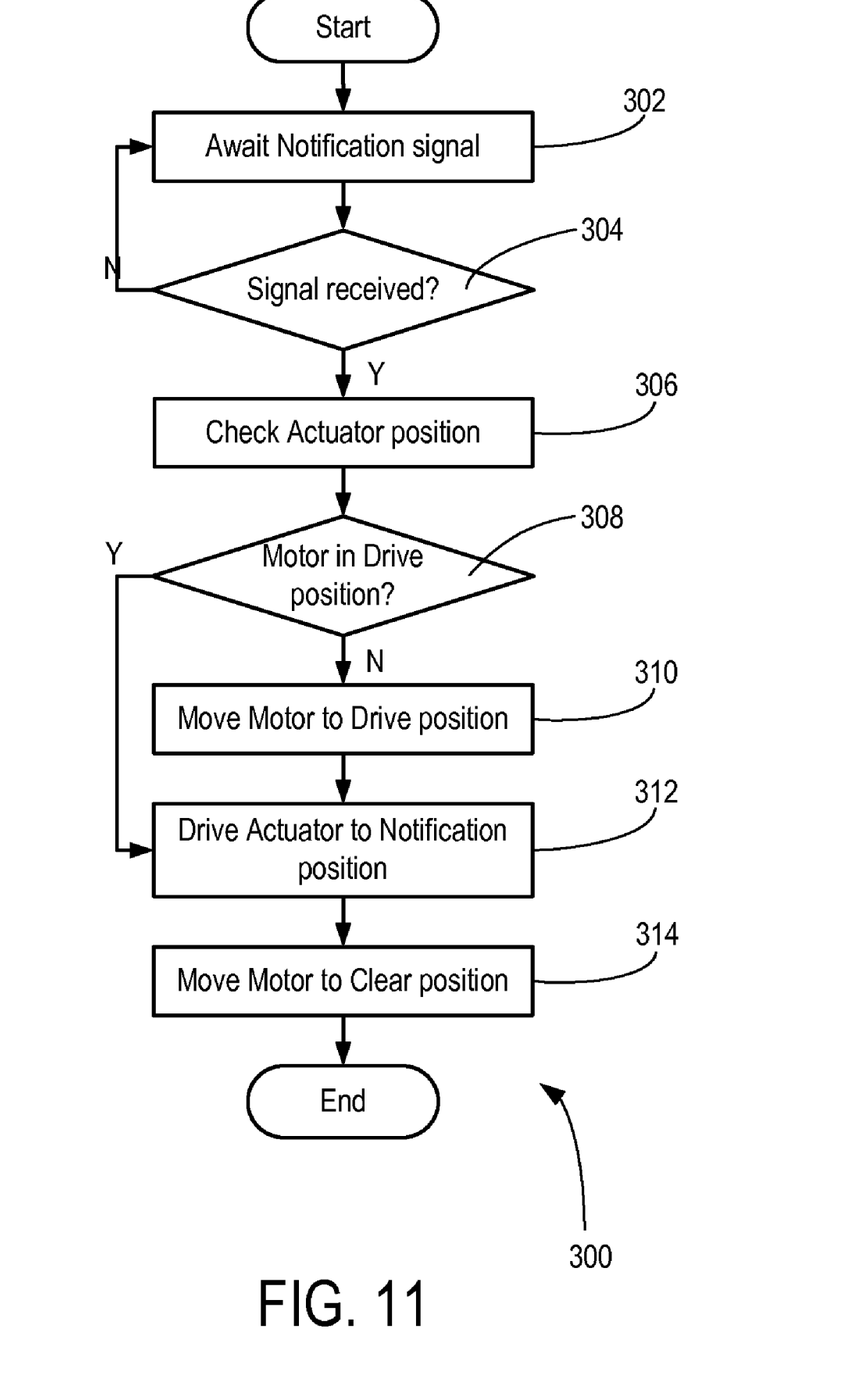
FIG. 11 is a flowchart of an illustrative method of automatically driving an actuator on a mobile device according to the invention.

It should be appreciated that, after driving the threaded screw 244, the motor 240 automatically positions itself so the actuator 210 can still be freely moved manually—see, for example, schematic reference numeral 314 in FIG. 11.

It may be appreciated that FIGS. 3-4 and 7-8 show the actuator notification system 200 in a first "drive" configuration and a second "drive" configuration, respectively. The configurations (and the positions for the motor 240) shown in FIGS. 3-4 and 7-8 may be considered "drive" insofar as the actuator 210 may be automatically driven, in one direction or another, from the shown positions.

From the foregoing, it may be appreciated that during operation (when moving the actuator 210 between the first and second positions) the motor 240 substantially engages the housing 170 in substantially juxtaposed relation, but with the stop members 230, 232 substantially interposed between the motor 240 and the housing 170. The term "juxtaposed" is broad enough to encompass both of the following meanings: "side-by-side with" and "very close or proximate to". Even when the stop members 230, 232 are interposed between the motor 240 and the housing 170, the motor 240 may still be properly characterized as being in "substantially juxtaposed" relation with the housing 170. In some embodiments of the invention, the stop members 230, 232 may be integrally provided as part of the housing 170, or they may otherwise be characterized as part of the housing 170. In such situations, the motor 240 may be characterized as "engaging" the housing 170 directly. It is not necessary for the motor 240 to directly engage the housing 170. For example, in some embodiments of the invention, the stop members 230, 232 may not be part of the housing 170. In exemplary situations of this type, the motor 240 may be properly characterized as, at least, "substantially engaging" the housing 170 through agency of the stop members 230, 232. Lastly, the motor 240 need not always engage or substantially engage the housing 170. For example, in some embodiments of the invention, the motor 240 can move to an intermediate clear configuration—i.e., out of engagement with the stop members 230, 232 (and the housing 170) as shown in FIG. 5. During operation, the motor 240 then engages and/or substantially engages the housing 170 to move the actuator 210 between the first and second positions. In at least this sense, the motor 240 may be properly characterized as "operatively" engaging and/or substantially engaging the housing 170.

Preferably, and as may be best appreciated from consideration of FIG. 10, each of the stop members 230, 232 is adapted for respective resilient deformation. Preferably, the stop members 230, 232 will resiliently deform when the threaded screw 244 is urged thereagainst with a force substantially in excess of that ordinarily experienced—e.g., when the actuator 210 is driven by the motor 240. For example, a user may endeavor to selectively move the manipulable portion 212 of the actuator 210 before the motor 240 has moved the actuator notification system 200 to one of the "clear" configurations (shown in FIGS. 3, 5 and 7). In such event, the threaded screw 244 may be urged against one of the stop members 230, 232 with a force substantially in excess of that normally experienced when the actuator 210 is driven by the motor 240.

FIG. 10 shows an example where a user has endeavored to return the manipulable portion 212 of the actuator 210 into the intermediate configuration, from the first position shown in FIG. 9, before the motor 240 has moved the actuator notification system 200 to the first "clear" configuration shown in FIG. 3. FIG. 10 shows the second end portion 252 of the threaded screw 244 has been urged force sufficient to resiliently deform the second stop member 232. Preferably, upon removal of force applied by the user, the second stop member 232 may resiliently return, and the actuator 210 may move therewith, to the configuration shown in FIG. 9. Alternately, the motor 240 may translate the threaded screw 244 in direction "A", such that the second stop member 232 may resiliently return, and the motor 240 may move, to the configuration shown in FIG. 8.

Apart from, or in addition to, the resiliently deformable stop members 230, 232, other means may be used, as may be well-known in the art, to prevent damage to the actuator 210 and/or to the actuator notification system 200, such as, for example, a friction coupling.

The present invention is also capable of adaptation, as may be appreciated from the disclosures herein, for use in association with an actuator 210 that is biased to a default position. In such an embodiment, the motor 240 may drive the actuator 210, against the force of a biasing means such as a spring (not shown) mounted to the housing 170, to an actuating position. Alternately, the motor 240 could drive the spring loaded actuator 210 against the spring to a locked position to show that the function is not available at that time.

As aforesaid, the actuator control module 180 may be operatively connected to the main processor 102. As such, the actuator control module 180 may pass acquired actuator position data to one or more software applications 134, and to store the actuator position data as may be required into flash memory 108 or RAM 106.

Where the device 100 includes a plurality of automatically driven actuators 210, and as may be appreciated in view of the disclosures herein, a single motor 240 might be provided along with an actuator arm (not shown) and a stepper motor (not shown). In such an embodiment, the stepper motor might be adapted to move the actuator arm into engagement with a selected one of the actuators 210 which is to be moved into a differing position.

Though the actuator 210 is noted elsewhere herein as, preferably, securely engaging the motor 240, it should perhaps be specifically noted that it is not always necessary for the actuator 210 to do so. For example, persons having ordinary skill in the art will appreciate that, in some embodiments which lay within the scope of the present invention, the motor 240 may securely engage the housing 170, and engage the actuator 210 only when necessary, during operation, to move the actuator 210 between the first and second positions. In at least this sense, persons having ordinary skill in the art will appreciate that the motor 240 may be properly characterized as "operatively engaging" the actuator 210.

Actuator notification using the actuator control module 180 may be initiated by a user—in addition to by hand operation of the actuator 210 itself—by controlling a dedicated notification button or a context dependent programmable button or key (on keyboard 116, for example) that may double as an actuator notification button.

FIG. 11 shows, schematically by way of overview, an associated method 300 of automatically driving the actuator 210 on the mobile device 100. The method includes steps (a) and (b), among others.

In step (a), the main processor 102 on-board the device 100 is encoded to start the motor 240, so as to drive the actuator 210 between the first and second positions, and/or towards the intermediate position. In step (a), the main processor 102 may be operatively encoded to start the motor 240 in dependence upon one of the software applications 134 operatively loaded onto the device 100. The software applications 134 may be responsible for sending, and the main processor 102 may await, a notification signal to start the motor 240—see, for example, schematic reference numerals 302 and 304 in FIG. 11.

Before step (b), the electrical contacts 220, 220 operatively communicate the present position of the actuator 210 to the main processor 102. The main processor 102 may check the position of the actuator 210 before starting the motor 240—see, for example, schematic reference numeral 306 in FIG. 11.

In step (b), the actuator 210 is driven, by the motor 240, between the first position (shown in FIGS. 3 and 9) and the second position (shown in FIGS. 6-7 and 10). See, for example, schematic reference numeral 312 in FIG. 11. Whether the motor 240 drives the actuator 210 towards the first position or the second position may depend on the notification signal received from the software applications 134. In the result, either the first position or the second position (or the intermediate position) may be considered to be a desired "notification position" for the actuator 210. In step (b), the actuator 210 may be switched between a plurality of discrete positions, or it may slide over a continuously varying range of positions. Step (b) includes substeps (i) and (ii).

In substep (i), as best seen in FIGS. 3 and 4, the first end portion 250 of the threaded screw 244 is urged against the first stop member 230, in direction "A", when the motor 240 drives the actuator 210 towards the second position (shown in FIG. 6). The main processor 102 is operatively encoded to longitudinally translate: the first end portion 250 into operative engagement with the first stop member 230 before substep (i); and the second end portion 252 into operative engagement with the second stop member 232 after substep (i).

In substep (ii), and as best seen in FIGS. 7 and 8, the second end portion 252 of the threaded screw 244 is urged against the second stop member 232, in direction "B", when the motor 240 drives the actuator 210 towards the first position (shown in FIG. 9). The main processor 102 is operatively encoded to longitudinally translate: the second end portion 252 into operative engagement with the second stop member 232 before substep (ii); and the first end portion 250 into operative engagement with the first stop member 230 after substep (ii).

Alternately, or in addition, the main processor 102 may be operatively encoded to longitudinally translate: the first end portion 250 into operative engagement with the first stop member 230 before moving the actuator 210, in direction "B", from the first position; the second end portion 252 into operative engagement with the second stop member 232 before moving the actuator 210, in direction "A", from the second position; and/or the threaded screw 244 out from engagement with both of the stop members 230, 232, after the actuator is moved into the intermediate position.

It should be appreciated that, before driving the actuator 210 to one of the desired notification positions, the motor 240 automatically positions itself in an appropriate one of the drive positions—i.e., so that the actuator 210 is ready to be automatically driven towards (or from) the first position or the second position. See, for example, schematic reference numerals 308 and 310 in FIG. 11.

It may be worthwhile to note that, although the mobile device 100 is shown as a mobile communication device in FIG. 2, the present invention is also suitable to automatically drive actuators 210 on other mobile devices 100, such as, for example, cellular phones, music players, GPS receivers, remote controls and key fobs.

The automatically driven actuator 210 can be adjusted by the device 100 and software 134 because of, for example, an inactivity timeout or it may be automatically unlocked via the UI upon entry of a user password. Of course, similar contemplated functionality could be described for other functions as well (e.g., profiles, wireless on and off).

Preferably, the automatically driven actuator 210 may provide visual and/or tactile feedback of its setting, and/or may be operated blindly (or even when it is in the pocket of a user). Preferably, the software 134 may also drive the position of the actuator 210—e.g., a button switch—upon a software timeout for keylock. Preferably, use of the present invention may enable the actuator 210 to always be in sync with settings of the software 134, even when the settings are changed through via the UI on the device 100.

It may be worthwhile to note that, while the present invention may be used with an actuator 210 to detect "user overrides", it may also be useful without such an actuator 210—i.e., it may also find numerous utilities in mobile devices 100 for the disclosed physical/mechanical notification function, on its own.

Thus, in an aspect, there is provided a mobile communications device including a housing, an actuator, an electric drive motor, and a control processor. The actuator is mounted on the housing and is selectively movable, by hand, between a first position and a second position. The motor operatively engages the actuator. Operatively, it also substantially engages the housing in substantially juxtaposed relation. The control processor is operatively encoded to start the motor, so as to drive the actuator between the first position and the second position.

In an embodiment, the motor is bi-stable, and preferably, it is a piezo-electric motor. Still more preferably, the piezo-electric motor is a linear motor which includes a threaded nut and a mating elongate threaded screw. The threaded nut or the mating threaded screw is a piezo-electric ceramic element. The actuator securely engages the threaded nut or the mating threaded screw. The control processor, in starting the motor, longitudinally translates the threaded nut and the mating threaded screw relative to one another.

In a preferred embodiment, the threaded nut is the piezo-electric ceramic element and/or the actuator securely engages the threaded nut.

In an embodiment, the device also includes a first stop member and a second stop member. Each securely engages an inside wall of the housing, and each is operatively positioned in substantially interposed relation between the motor and the housing. The threaded screw includes a first end portion and a longitudinally opposing second end portion. The first end portion operatively engages the first stop member when the motor drives the actuator towards the second position. The second end portion operatively engages the second stop member when the motor drives the actuator towards the first position.

In an embodiment, the control processor is operatively encoded to start the motor to longitudinally translate: (i) the first end portion into operative engagement with the first stop member before the motor drives the actuator towards the second position; and (ii) the second end portion into operative engagement with the second stop member before the motor drives the actuator towards the first position.

In an embodiment, the control processor is operatively encoded to start the motor to longitudinally translate: (i) the first end portion into operative engagement with the first stop member after the actuator is moved into the first position; and (ii) the second end portion into operative engagement with the second stop member after the actuator is moved into the second position.

In an embodiment, the actuator is selectively movable, by hand or by the motor, towards an intermediate position between the first position and the second position. The control processor is operatively encoded to start the motor: (i) to drive the actuator towards the intermediate position; and (ii) to longitudinally translate the threaded screw, out from engagement with both the first stop member and the second stop member, after the actuator is moved into the intermediate position.

In an embodiment, each of the first stop member and the second stop member is adapted for respective resilient deformation when the threaded screw is urged thereagainst with a force substantially in excess of that ordinarily experienced when the actuator is driven by the motor.

In another embodiment, the actuator is selectively movable, by hand or by the motor, towards an intermediate position between the first position and the second position. The control processor is operatively encoded to start the motor to drive the actuator towards the intermediate position.

In an embodiment, the device also includes a pair of mating electrical contacts, mounted on the housing and the actuator, to operatively communicate a present position of the actuator to the control processor.

In other embodiments, the actuator may be a sliding switch having a plurality of discrete positions, or it may be a continuously variable switch.

In an embodiment, the control processor is operatively encoded to start the motor in dependence upon the processing of software application code operatively loaded onto the device.

In another aspect, there is provided an actuator notification system for use with a mobile communications device. The system includes an actuator, an electric drive motor, and a control processor. The actuator is mounted on a housing of the device and is selectively movable, by hand, between a first position and a second position. The electric drive motor operatively engages the actuator. In operation, it also substantially engages the housing in substantially juxtaposed relation. The control processor is on-board the device and is operatively encoded to start the motor, so as to drive the actuator between the first position and the second position.

In an embodiment, the motor is bi-stable, and preferably, it is a piezo-electric motor. Still more preferably, the piezo-electric motor is a linear motor which includes a threaded nut and a mating elongate threaded screw. The threaded nut or the mating threaded screw is a piezo-electric ceramic element. The actuator securely engages the threaded nut or the mating threaded screw. The control processor, in starting the motor, longitudinally translates the threaded nut and the mating threaded screw relative to one another.

In a preferred embodiment, the threaded nut is the piezo-electric ceramic element and/or the actuator securely engages the threaded nut.

In an embodiment, the system also includes a first stop member and a second stop member. Each securely engages an inside wall of the housing, and each is operatively positioned in substantially interposed relation between the motor and the housing. The threaded screw has a first end portion and a longitudinally opposing second end portion. The first end portion operatively engages the first stop member when the motor drives the actuator towards the second position. The second end portion operatively engages the second stop member when the motor drives the actuator towards the first position.

In an embodiment, the control processor code is operatively encoded to start the motor to longitudinally translate: (i) the first end portion into operative engagement with the first stop member before the motor drives the actuator towards the second position; and (ii) the second end portion into operative engagement with the second stop member before the motor drives the actuator towards the first position.

In an embodiment, the control processor is operatively encoded to start the motor to longitudinally translate: (i) the first end portion into operative engagement with the first stop member after the actuator is moved into the first position; and (ii) the second end portion into operative engagement with the second stop member after the actuator is moved into the second position.

In an embodiment, the actuator is selectively movable, by hand or by the motor, towards an intermediate position between the first position and the second position. The control processor is operatively encoded to start the motor: (i) to drive the actuator towards the intermediate position; and (ii) to longitudinally translate the threaded screw, out from engagement with both the first stop member and the second stop member, after the actuator is moved into the intermediate position.

In an embodiment, each of the first stop member and the second stop member is adapted for resilient deformation when the threaded screw is urged thereagainst with a force substantially in excess of that ordinarily experienced when the actuator is driven by the motor.

In another embodiment, the actuator is selectively movable, by hand or by the motor, towards an intermediate position between the first position and the second position. The control processor is operatively encoded to start the motor to drive the actuator towards the intermediate position.

In an embodiment, the system also includes a pair of mating electrical contacts, mounted on the housing and the actuator, to operatively communicate a present position of the actuator to the control processor.

In other embodiments, the actuator may be a sliding switch having a plurality of discrete positions, or a continuously variable switch.

In an embodiment, the control processor is operatively encoded to start the motor in dependence upon the processing of software application code operatively loaded onto the device.

In a further aspect, there is provided a method of automatically driving an actuator on a mobile communications device. The actuator is selectively movable, by hand, between a first position and a second position. The method includes steps (a) and (b). In step (a), a control processor on-board the device is encoded to start an electric drive motor that operatively engages the actuator, and operatively substantially engages a housing of the device in substantially juxtaposed relation. In step (b), the actuator is driven, with the motor, between the first position and the second position.

In an embodiment, in step (a), the motor is a piezo-electric linear motor which includes a threaded nut and a mating elongate threaded screw. In step (b), the threaded nut and the mating threaded screw are longitudinally translated relative to one another.

In an embodiment, the device is provided with a first stop member and a second stop member. Each securely engages an inside wall of the housing and each is operatively positioned in substantially interposed relation between the motor and the housing. Step (b) includes substeps (i) and (ii). In substep (i), the first end portion of the threaded screw is urged against the first stop member when the motor drives the actuator towards the second position. In substep (ii), a second end portion of the threaded screw, longitudinally opposed the first end portion, is urged against the second stop member when the motor drives the actuator towards the first position.

In an embodiment, the control processor is operatively encoded to longitudinally translate: the first end portion into operative engagement with the first stop member before substep (i); and the second end portion into operative engagement with the second stop member before substep (ii).

In an embodiment, the control processor is operatively encoded to longitudinally translate: the second end portion into operative engagement with the second stop member after substep (i); and the first end portion into operative engagement with the first stop member after substep (ii).

In an embodiment, the actuator is selectively movable, by hand or by the motor, towards an intermediate position between the first position and the second position. In step (a), the control processor is operatively encoded to start the motor, so as to drive the actuator towards the intermediate position. In step (b), the threaded screw is longitudinally translated, out from engagement with both the first stop member and the second stop member, after the actuator is moved into the intermediate position.

In another embodiment, the actuator is selectively movable, by hand or by the motor, towards an intermediate position between the first position and the second position. In step (a), the control processor is operatively encoded to start the motor to drive the actuator towards the intermediate position.

In an embodiment, before step (b), a pair of mating electrical contacts, mounted on the housing and the actuator, operatively communicate a present position of the actuator to the control processor.

In other embodiments, in step (b), the actuator may be switched between a plurality of discrete positions, or it may slide over a continuously varying range of positions.

In an embodiment, in step (a), the control processor is operatively encoded to start the motor in dependence upon the processing of software application code operatively loaded onto the device.

While illustrative embodiments have been described above, it will be appreciated that various changes and modifications may be made. More generally, the scope of the invention is defined by the following claims.

What is claimed is:

1. A mobile communications device comprising:
  (a) a housing;
  (b) an actuator mounted on the housing and selectively movable, by hand, between a first position and a second position;
  (c) a bi-stable piezo-electric linear drive motor operatively engaging the actuator, and operatively substantially engaging the housing in substantially juxtaposed relation, the motor comprising a threaded nut and a mating elongate threaded screw, wherein the threaded nut or the mating threaded screw is a piezo-electric ceramic element and wherein the actuator securely engages the threaded nut or the mating threaded screw;
  (d) a control processor operatively encoded to start the motor, so as to drive the actuator between the first position and the second position by longitudinally translating the threaded nut and the mating threaded screw relative to one another; and
  (e) a first stop member and a second stop member, each securely engaging an inside wall of the housing and each operatively positioned in substantially interposed relation between the motor and the housing; and wherein the threaded screw comprises a first end portion and a longitudinally opposing second end portion, with the first end portion operatively engaging the first stop member when the motor drives the actuator towards the second position, and with the second end portion operatively engaging the second stop member when the motor drives the actuator towards the first position.

2. The device according to claim 1, wherein the control processor is operatively encoded to start the motor to longitudinally translate: (i) the first end portion into operative engagement with the first stop member before the motor drives the actuator towards the second position; and (ii) the second end portion into operative engagement with the second stop member before the motor drives the actuator towards the first position.

3. The device according to claim 1, wherein the control processor is operatively encoded to start the motor to longitudinally translate: (i) the first end portion into operative engagement with the first stop member after the actuator is moved into the first position; and (ii) the second end portion into operative engagement with the second stop member after the actuator is moved into the second position.

4. The device according to claim 1, wherein the actuator is selectively movable, by hand or by the motor, towards an intermediate position between the first position and the second position; wherein the control processor is operatively encoded to start the motor: (i) to drive the actuator towards the intermediate position; and (ii) to longitudinally translate the threaded screw, out from engagement with both the first stop member and the second stop member, after the actuator is moved into the intermediate position.

5. The device according to claim 1, wherein each of the first stop member and the second stop member is adapted for respective resilient deformation when the threaded screw is urged thereagainst with a force substantially in excess of that ordinarily experienced when the actuator is driven by the motor.

6. The device according to claim 1, wherein the actuator is selectively movable, by hand or by the motor, towards an intermediate position between the first position and the second position; and wherein the control processor is operatively encoded to start the motor to drive the actuator towards the intermediate position.

7. The device according to claim 1, further comprising a pair of mating electrical contacts, mounted on the housing and the actuator, to operatively communicate a present position of the actuator to the control processor.

8. The device according to claim 1, wherein the actuator is a sliding switch having a plurality of discrete positions.

9. The device according to claim 1, wherein the actuator is a continuously variable switch.

10. The device according to claim 1, wherein the control processor is operatively encoded to start the motor in dependence upon the processing of software application code operatively loaded onto the device.

11. An actuator notification system for use with a mobile communications device, wherein the system comprises:
  (a) an actuator able to be mounted on a housing of the device and selectively movable, by hand, between a first position and a second position;

(b) a bi-stable piezo-electric linear drive motor operatively engaging the actuator, and able to operatively substantially engage the housing in substantially juxtaposed relation, the motor comprising a threaded nut and a mating elongate threaded screw, wherein the threaded nut or the mating threaded screw is a piezo-electric ceramic element and wherein the actuator securely engages the threaded nut or the mating elongate screw; and (c) a control processor on-board the device and operatively encoded to start the motor, so as to drive the actuator between the first position and the second position by longitudinally translating the threaded nut and the mating threaded screw relative to one another, wherein a first end portion of the threaded screw is able to operatively engage a first stop member of the device when the motor drives the actuator towards the second position and wherein a second end portion of the threaded screw that is longitudinally opposing the first end portion is able to operatively engage a second stop member of the device when the motor drives the actuator towards the first position, the first stop member and the second stop member securely engaging an inside wall of the housing and operatively positioned in substantially interposed relation between the motor and the housing.

12. A method of automatically driving an actuator on a mobile communications device, with the actuator being selectively movable, by hand, between a first position and a second position, wherein the method comprises:

(a) encoding a control processor on-board the device to start a bi-stable piezoelectric linear drive motor that operatively engages the actuator, and operatively substantially engages a housing of the device in substantially juxtaposed relation, the motor comprising a threaded nut and a mating elongate threaded screw; and (b) driving the actuator, with the motor, between the first position and the second position by performing the substeps of:

(i) urging a first end portion of the threaded screw against a first stop member of the device when the motor drives the actuator towards the second position; and (ii) urging a second end portion of the threaded screw, longitudinally opposed to the first end portion, against a second stop member of the device when the motor drives the actuator towards the first position, wherein the first stop member and the second stop member are securely engaging an inside wall of the housing and operatively positioned in substantially interposed relation between the motor and the housing, and wherein the threaded nut and the mating threaded screw are longitudinally translated relative to one another.

13. The method according to claim 12, wherein the control processor is operatively encoded to longitudinally translate: the first end portion into operative engagement with the first stop member before substep (i); and the second end portion into operative engagement with the second stop member before substep (ii).

14. The method according to claim 12, wherein the control processor is operatively encoded to longitudinally translate: the second end portion into operative engagement with the second stop member after substep (i); and the first end portion into operative engagement with the first stop member after substep (ii).

15. The method according to claim 12, wherein the actuator is selectively movable, by hand or by the motor, towards an intermediate position between the first position and the second position; wherein in step (a), the control processor is operatively encoded to start the motor, so as to drive the actuator towards the intermediate position; and wherein in step (b), the threaded screw is longitudinally translated, out from engagement with both the first stop member and the second stop member, after the actuator is moved into the intermediate position.

16. The method according to claim 12, wherein the actuator is selectively movable, by hand or by the motor, towards an intermediate position between the first position and the second position; and wherein in step (a), the control processor is operatively encoded to start the motor to drive the actuator towards the intermediate position.

17. The method according to claim 12, wherein before step (b), a pair of mating electrical contacts, mounted on the housing and the actuator, operatively communicate a present position of the actuator to the control processor.

18. The method according to claim 12, wherein in step (b), the actuator is switched between a plurality of discrete positions.

19. The method according to claim 12, wherein in step (b), the actuator slides over a continuously varying range of positions.

20. The method according to claim 12, wherein in step (a), the control processor is operatively encoded to start the motor in dependence upon the processing of software application code operatively loaded onto the device.

* * * * *